Figure 6:
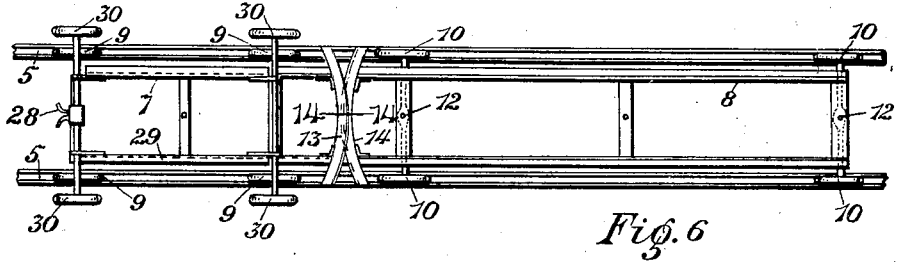

July 3, 1928. 1,675,972
W. C. COX
COURSING TRACK
Original Filed Aug. 11, 1923 3 Sheets-Sheet 1
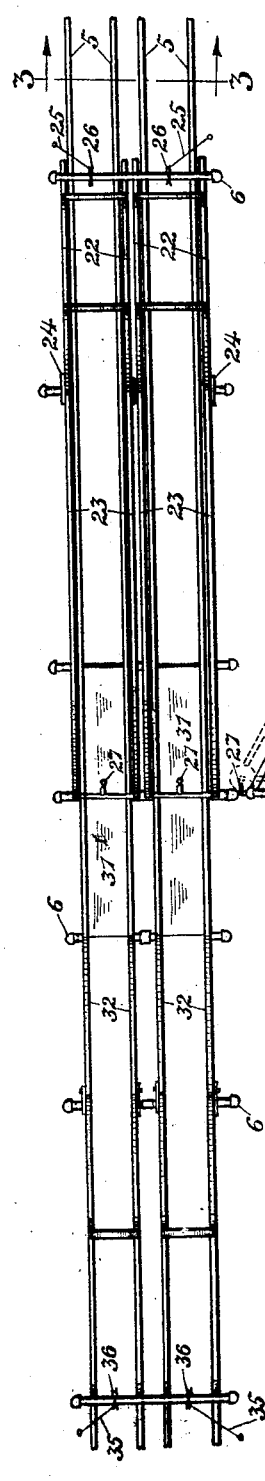
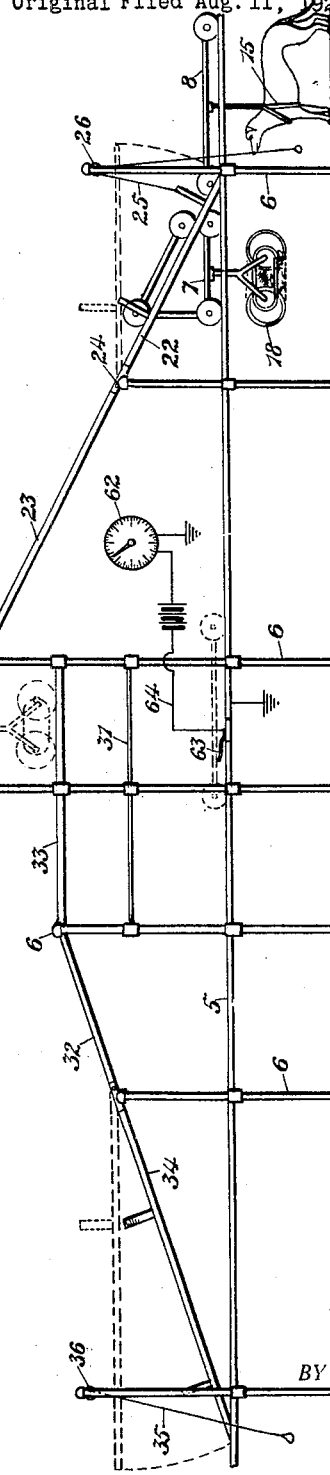
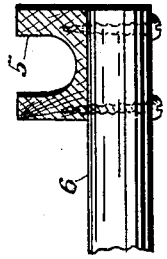
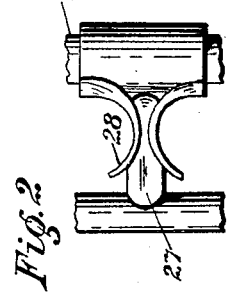
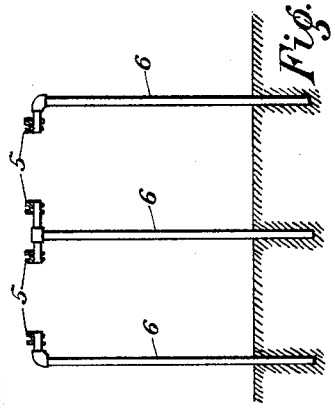
INVENTOR.
W. C. Cox
BY
ATTORNEY.

July 3, 1928.  
W. C. COX  
1,675,972  
COURSING TRACK  
Original Filed Aug. 11, 1923  3 Sheets-Sheet 2

INVENTOR.  
W. C. Cox  
ATTORNEY.

July 3, 1928.

W. C. COX

COURSING TRACK

Original Filed Aug. 11, 1923    3 Sheets-Sheet 3

1,675,972

INVENTOR.
W. C. Cox

BY
ATTORNEY.

Patented July 3, 1928.

1,675,972

UNITED STATES PATENT OFFICE.

WALTER CECIL COX, OF DENVER, COLORADO.

COURSING TRACK.

Application filed August 11, 1923, Serial No. 656,961. Renewed December 12, 1927.

My invention relates to coursing tracks and more particularly to tracks of the so-called enclosed type on which the speed of greyhounds and other animals is tested by means of a lure moved in advance thereof.

It is an object of the present invention to provide a simple and efficient mechanism for the propulsion of a lure or quarry in such a manner that it will entice the hounds to chase it along a determined course without being able to ever reach or overtake the same.

It is a salient point of the invention that live animals may be used as a means for enticing the dog to run along the course, with none of the objectionable features usually connected with open coursing since as stated before, the use of my invention prevents the dog from ever reaching its quarry.

A further object of my invention resides in the provision of means for advancing the lure or quarry along the course by and in accordance with the movement of the hounds engaged in the competitive trial, and still another object is to provide in connection with such means, an efficient expedient for concealing the lure at a determinate point of the course so that after the hounds have ran a certain predetermined distance, the race may be ended by removing the lures which enticed them to run, from their sight.

An additional object of the invention resides in the provision of means to automatically indicate the speed attained by the hounds in running along the track and many other distinctive features of the invention are to be found in the construction and arrangement of its constituent elements, all of which will be fully set forth in the course of the following description made with reference to the accompanying drawings.

It will be evident that the aim and purpose of the invention may be attained in several different ways, and although different methods of accomplishing the above described objects have been disclosed in the present application, other means may be devised and variations in construction may be resorted to within the spirit and scope of my invention as defined in the hereunto appended claims.

Figure 7:
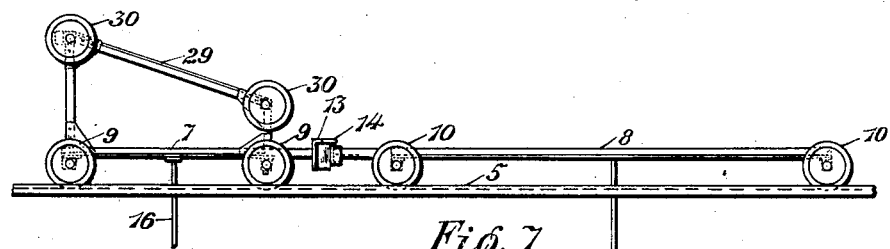
Figure 8:
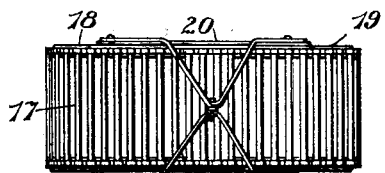
Figure 10:
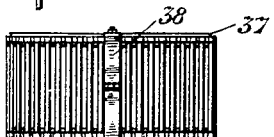
Figure 9:
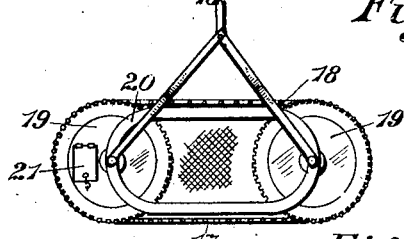
Figure 11:
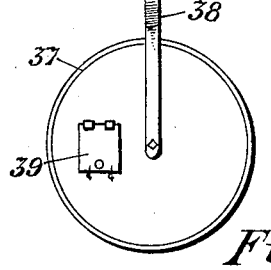
Figure 12:
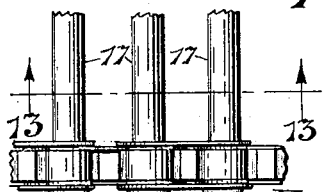
Figure 14:
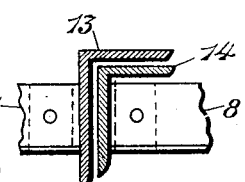
Figure 13:
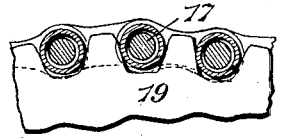
Figure 15:
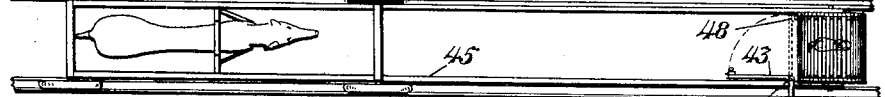
Figure 16:
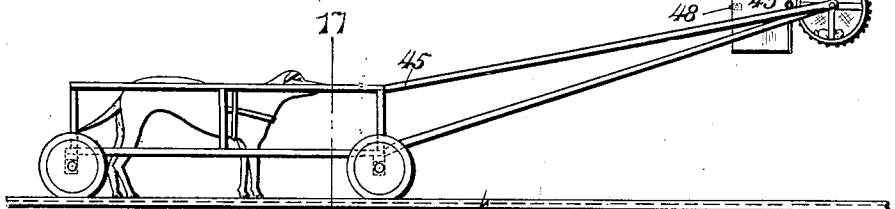
Figure 17:
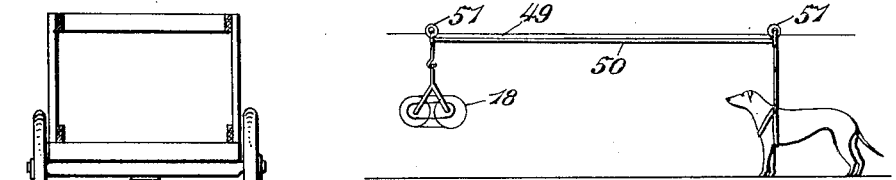
Figure 18:
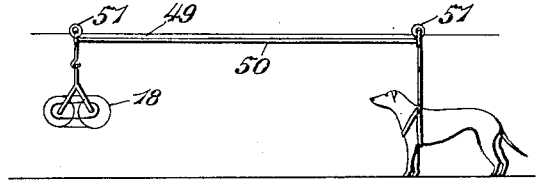
Figure 20:
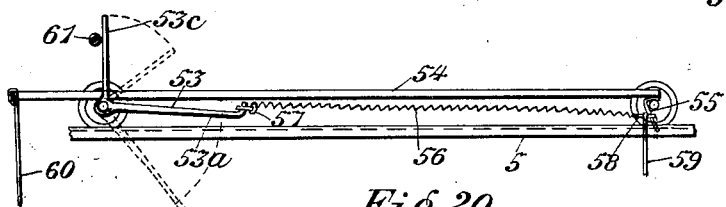
Figure 19:
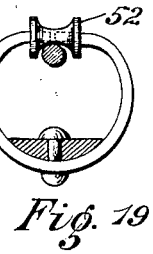
Figure 21:
Figure 22:
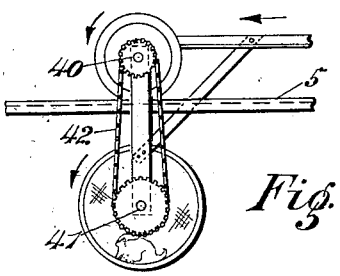

In the drawings in which like characters of reference designate corresponding parts throughout the several views, Figure 1 is a plan view of a portion of the track at the starting and finishing point thereof;

Figure 2, a side elevation of the track shown in Figure 1;

Figure 3, a cross section of the track on the line 3—3, Figure 1;

Figure 4, an enlarged detail view of the means employed to arrest the movement of the lure-carrier at the finish of the race in the use of the apparatus illustrated in Figures 1 and 2;

Figure 5, an enlarged section through one of the rails of the tracks of the course shown in Figures 1 and 2;

Figure 6, a plan view of the sectional carriage employed in connection with the track illustrated in the other views;

Figure 7, a side elevation of the carriage shown in Figure 6;

Figure 8, a top view of the quarry cage connected with the carriage, drawn to an enlarged scale;

Figure 9, a side elevation of the same;

Figure 10, a plan view of a lure-cage of modified construction;

Figure 11, a side elevation of the cage shown in Figure 10;

Figure 12, an enlarged fragmentary top view of the movable element included in the construction of the cages;

Figure 13, a section taken on the line 13—13, Figure 12;

Figure 14, an enlarged section along the line 14—14, Figure 6;

Figure 15, a plan view of a carriage of modified construction;

Figure 16, a side elevation of the carriage illustrated in Figure 15;

Figure 17, an enlarged section along the line 17—17, Figure 16;

Figure 18, an outline elevation illustrating a different method of carrying the invention into effect;

Figure 19, an enlarged, partially sectional view of one of the suspension members employed in the construction shown in Figure 18;

Figure 20, an elevation of a carriage of modified construction;

Figure 21, a fragmentary plan view of the rear-end portion of the carriage shown in Figure 20; and Figure 22, a fragmentary side elevation of the carriage showing still another modification in its construction.

Referring first to Figures 1 to 9 of the drawings, my invention comprises two rail tracks 5 which are supported in an elevated position upon cross-arms of poles 6 preferably arranged as shown in Figure 3.

The tracks extend along the course in parallel relation to each other and at a sufficient distance apart to permit of two dogs racing side by side after lures moved along the tracks, without interfering with each other.

The course may be of any desired length and form, it being preferred to make it endless and in oval shape so that the race is finished at the same point from which the hounds are started.

It will be understood, however, that if so desired the course may be laid in the form of a straightway in which case the point of finish is at the end of the tracks opposite to the starting point.

Inasmuch as the last mentioned arrangement involves only structural changes in the construction of the tracks and the switch devices associated therewith, the description of the endless track will be sufficient to convey a complete understanding of the operation of the invention.

The rails of which the elevated tracks are composed are preferably concave as shown in Figure 5, and they may be made of wood or other soft material to deaden the sound of the carriages moving along the tracks, it being apparent that in order to obtain the best results, it is necessary that nothing should detract the attention of the dogs from the quarries they are chasing.

The carriage illustrated in Figure 6 is made in two sections 7 and 8 each comprising a light frame supported upon rubber tired wheels 9 and 10. The wheels are preferably coupled in pairs and pivoted on the frames as at 12 to facilitate the movement of the carriage around the curves of the track.

The two sections of the carriage have at their adjoining ends, curved coupling bars 13 and 14 of angle section which loosely engage each other as best shown in Figure 14 so that the rearmost section can push the other along the track, while the foremost section may move separately onto a side track while the propelling section continues its movement along the main line of the course.

The rear section of the carriage is provided with a suspended tether or harness 15 adapted to be attached to a hound running on the ground beneath the track on which the carriage is supported.

The harness may be of any suitable form and construction to enable the animal to propel the carriage along the track without hindering the movement of its limbs or otherwise interfering with its desire to chase a lure supported on the foremost section of the carriage.

The lure may consists of a live animal, preferably a rabbit, which is enclosed in a cage 18 suspended from the carriage in advance of a hound attached to the carriage by the harness hereinbefore described. The cage 18 is suspended by means of a rod 16 or other suitable device and in its preferred form consists of an endless floor 17 composed of parallel chains and interconnected cross-slats and movably supported upon two sets of webbed sprocket wheels 19 rotatably mounted at opposite ends of a frame 20 which is closed at the sides of the cage.

The animal placed inside the cage through a door 21 in the web of one of the sprocket wheels, is induced to keep in motion upon the moving floor thereof and thereby stimulates the desire of the hound which sees the animal through the spaces between the slats of the floor, to reach the same.

In the operation of my invention, two hounds fastened in the harnesses of carriages alined on the two parallel railway tracks of the course, are held by the attendants until the starter gives the signal to begin the race. When the dogs are subsequently released they will endeavor to reach the rabbits in the cages at the front of their respective carriages and by their movement propel the carriages along the tracks. In their eagerness to catch their prey, the hounds will soon run at their topmost speed, thereby affording to the spectators the pleasure of testing the speed of one against the other.

When the tracks are laid along an endless course, the hounds may be made to traverse the length thereof as many times as is required to cover a predetermined distance, or if the course is made sufficiently long one turn thereof will conclude the race.

The hounds chasing after the lures often attain considerable speed and in order to finish the race after the predetermined distance has been run, the lure must be removed from their sight while the contest is in progress.

In order to accomplish this result at the will of the attendants, I have provided at the finishing point of the course, which in the construction shown in the drawing, is juxtaposed to the starting point, an adjustable switch which will cause the front section of the carriage to which the lure-cage is attached to move away from the other section behind a screen which conceals it from the dog.

The switch designated in Figures 1 and 2 of the drawings by the reference character 22, forms a connection between the main track and an inclined track 23 which slants upwardly from the other. The switch is hinged as at 24 and means for moving it to the open position shown in broken lines in Figure 2, is provided by pull ropes 25 trained over pulleys 26 on a cross arm of two of the poles on which the tracks are supported.

At the top of the inclined track is a stop 27 which by engagement with a spring clamp 28 at the front of the carriage arrests its movement, and locks it against retrograde motion until it is removed by the attendant.

The inclined track and the switch which normally forms a continuation thereof, are of wider gage than the main track of the course and the front section of the carriage carries on a superstructure 29 of its frame two pairs of wheels 30 gaged and relatively arranged to correspond with the inclined track as shown in the drawings.

It will thus be seen that when the switch is closed as indicated in full lines in Figure 2, the front section of the rapidly propelled carriage will be compelled by its momentum to move upwardly on the inclined track engaged by the wheels on its superstructure while the section of the carriage to which the dog is attached, continues its way along the main track of the course until the dog stops or is caught by its trainer.

A screen 31 made of canvas, wood or other suitable material between the main track 5 and the upper portion of the inclined track 23 at which the movement of the front section of the carriage is arrested, conceals the lure from the dog attached to the rear section of the carriage and thus removes the inducement to continue the chase.

It is desirable that at the beginning of the race, the hounds attain their speed as soon as possible and with that end in view, I have provided means for causing the front section of the carriage on which the quarry is carried to move by its own momentum ahead of the propelling section of the carriage before the dog attached to said section is released.

The means as shown in Figures 2 and 3, consist of an inclined track 32 slanting downwardly from an elevated platform 33 above the main track at the starting point of the course.

The inclined track includes a hinged switch 34 which connects it with the main track and which may be opened by means of pull ropes 35 running over pulleys 36 on a cross arm of two of the poles upon which the tracks are supported, to the position indicated in broken lines in Figure 2.

To begin the race by the use of the above described structure, the hound attached to a carriage standing beneath the screen, is held by its attendant, while another attendant removes the front section of the carriage from which the lure is suspended, from the inclined track 23 onto the platform 33 and thence pushes it onto the inclined starting track 32 the switch 34 of which has previously been closed.

As soon as the section 7 of the carriage reaches the main track, the dog is released, and enticed by the sight of the rapidly moving lure, at once gives chase at a rapidly increasing speed until the two carriages are brought in engagement after which the race is continued as hereinbefore explained.

It will be evident that when the switches of the two inclined tracks are opened, as shown in broken lines in Figure 2, the carriages may continue their movement around the track as many times as is necessary to cover the required distance or until the attendant lowers the switch of the track 23 to finish the race.

A cage of modified construction illustrated in Figures 10 and 11, consists of a circumferentially slatted drum 37 rotatably suspended in a yoke 38 which by means of the rod 16 is connected to the carriage.

A door 39 in a side of the drum gives access to its interior and it will be apparent that a rabbit or other small animal placed inside the drum is induced to make a running movement as in the endless-floor cage hereinbefore described.

It will be readily understood that a live animal and more particularly a moving animal provides a far more enticing lure for the racing hounds than the dummy animals which in other coursing devices are propelled along the race course by a motor or other mechanical or electrical appliance. However, a dummy lure may also be used in connection with my invention if so desired, and actuated to simulate the movement of a live animal by providing a driving connection between an axle of the carriage and the rotary cage suspended therefrom as has been illustrated in Figure 22 in which the axle 41 of the drum is connected with an axle 40 of the carriage by means of a sprocket chain 42.

As has been stated hereinbefore, many modifications in the construction and arrangement of the elements comprised in my improved coursing appliance may be availed of within the scope of my invention. For example: the tracks on which the carriages move, may be laid on the ground as illustrated in Figures 15, 16 and 17, and the lure-cage may be fastened at the front end of a carriage 45 to which the dog is attached, as shown in the same views. In a construction of this character, means different from that hereinbefore described, must be provided to conceal the lure from the dog at the end of the race, and I have shown as a simple and efficient expedient, a shutter 43 which is hinged to the frame of the carriage as at 44 and which is adapted to hide the cage from the sight of the dog, in its closed position shown in broken lines in Figure 15.

The shutter has an arm 46 which normally projects laterally from the carriage to engage with an obstruction 47 placed in its path by an attendant. The obstruction may consist of a hinged bar or any other device that will serve the purpose, it being evident that when the obstruction is held in a fixed position, its engagement with the arm will cause the shutter to move about its hinge to the closed position.

A spring latch 48 on the frame of the carriage automatically locks the shutter in the position in which it screens the lure from the sight of the dog.

In Figures 18 and 19 of the drawings has been illustrated an extremely simple form of both the carriage and the means for the support thereof.

A wire 49 is stretched along the course and a carriage consisting of a bar 50 provided at its opposite ends with means for the attachment of the lure cage and the dog tether, is movably suspended from the wire by means of rings 51 preferably provided with grooved rollers 52 as shown in Figure 19.

In Figures 20 and 21 has been illustrated a modification of my invention, in which the dog instead of the lure is detached from the carriage at the end of the race.

A bell crank 53 is fulcrumed on the front axle of a carriage 54 and a rearwardly slanting prong 55 is fastened at the rear end of the same.

A coiled spring 56 has at its opposite ends two rings 57 and 58 by means of which it is held in a stretched condition between the prong 55 and a hook-shaped extremity of the substantially horizontally extending arm 53ª of the bell crank, and the tether or harness 59 of the dog is fastened to the ring 58 engaging with the prong. The lure-cage is suspended at the front end of the carriage by means of a strap 60.

When, at the finish of the race it is desired to detach the dog from the carriage, an obstruction in the form of a pivoted arm or other suitable device, indicated in Figure 20 by the reference numeral 61, is thrown into the path of the upwardly projecting arm 53ᶜ of the bell crank with the result that the latter is compelled to turn about its pivotal axis to the position shown in broken lines.

During the downward movement of the bell crank, the ring 57 at the end of the spring is released, and the sudden contraction of the spring causes the ring 58 at the other end of the spring to disengage the slanting prong. The spring and the harness being thus detached from the carriage, fall to the ground while the carriage continues its movement by its momentum and the dog is retrieved by its trainer.

Although in the various forms of my invention illustrated in the drawings, the carriages have been shown as supported on wheels and the description mentions rubber-tired wheels as most suitable for the purpose, I desire it understood that other wheels may be employed that will deaden the noise of the movement of the carriage along its track and that sled-runners have been used for the same purpose with satisfactory results.

In connection with the tracks on which the carriages move, an appliance may be employed to automatically indicate the time taken by each dog in running a predetermined distance. An appliance of this kind has been shown diagrammatically in Figure 2 of the drawings in which 62 designates an electrical time indicating instrument of suitable construction, connected in a normally open electric circuit. An insulated contact 63 is adapted to be pressed against a conductive part of the track by the weight of the carriage at the point of the course at which the race is finished, and the contact is connected in the circuit 64 to complete the same through the medium of ground connections of the conductive part of the track and the indicating instrument.

Having thus described my invention, what I claim and desire to secure by Letters Patent is:

1. In a course of the character described, a lure supporting element adapted to move along the course, and means associated with said element for its propulsion by movement of an animal in its natural pursuit of the lure.

2. In a course of the character described, a carriage, means for its propulsion by an animal moving along the course, and means on the carriage for carrying a captive animal in sight of the other.

3. In a course of the character described, a carriage, means for its propulsion by an animal moving along the course, and means on the carriage for carrying a captive animal in sight of the other, said means being capable of inducing the captive element to simulate a running movement.

4. In a course of the character described, a carriage, means for its propulsion by an animal moving along the course, and a cage on the carriage for carrying a live animal in sight of the other.

5. In a course of the character described, a carriage, means for its propulsion by an animal moving along the course, and a cage on the carriage having a moving floor for the support of an animal in sight of the other.

6. In a course of the character described, a carriage, means for its propulsion by an animal moving along the course, and a revolving cage on the carriage for carrying an animal in sight of the other.

7. In a course of the character described, a carriage, means for its propulsion by an animal moving along the course, a lure-carrier movably supported on the carriage, and means to effect a movement of said carrier by movement of the carriage.

8. In a course of the character described, a lure-carrying carriage, and means for its propulsion by an animal following the lure along the course.

9. In a course of the character described, a railway track extending along the course, a lure-carrying carriage on said track, and means for the propulsion of the carriage by an animal following the lure along the course.

10. In a course of the character described, an elevated railway track extending along the course, a lure-carrying carriage on said track, and means for the propulsion of the carriage by an animal following the lure along the course.

11. In a course of the character described, a lure-carrying carriage, means for its propulsion by an animal following the lure along the course, and means for hiding the lure from the animal at a determinate point of the course.

12. In a course of the character described, a lure-carrying carriage, means for its propulsion by an animal following the lure along the course, means for hiding the lure from the animal, and an appliance for effecting the concealment of the lure by said means at a determinate point of the course.

13. In a course of the character described, a lure-carrying carriage, means for its propulsion by an animal following the lure along the course, and means for separating the lure and the animal at a determinate point of the course.

14. In a course of the character described, a railway track extending along the course, and a carriage on the track comprising a lure-carrying section and an impelling section in detachable engagement therewith, and means for the propulsion of the impelling section by an animal following the lure along the course.

15. In a course of the character described, a railway track extending along the course, a carriage on the track, comprising a lure-carrying section and an impelling section in detachable engagement therewith, and means for the propulsion of the impelling section by an animal moving along the course, and means for separating the sections of the carriage at a determinate point of the course.

16. In a course of the character described, a railway track extending along the course, a carriage on the track, comprising a lure-carrying section and an impelling section in detachable engagement therewith, and means for the propulsion of the impelling section by an animal moving along the course, a screen for hiding the lure-carrying section, and an appliance for separating the lure-carrying section from the other and cause it to move to one side of the screen, at a determinate point of the course.

17. In a course of the character described, a railway track extending along the course, a carriage on the track, comprising a lure-carrying section and an impelling section in detachable engagement therewith, means for the propulsion of the impelling section by an animal moving along the course, a screen for hiding the lure-carrying section, a track leading from the main track to one side of the screen, and a switch connecting the tracks.

18. In a course of the character described, a railway track extending along the course, a carriage on the track, comprising a lure-carrying section and an impelling section in detachable engagement therewith, means for the propulsion of the impelling section by an animal moving along the course, a screen for hiding the lure-carrying section, a track of different gage inclined from the main track to one side of the screen, and wheels on the lure-carrying section co-operating with the inclined track.

19. In a course of the character described, a railway track extending along the course, a carriage on the track, comprising a lure-carrying section and an impelling section in detachable engagement therewith, means for the propulsion of the impelling section by an animal moving along the course, a screen for hiding the lure-carrying section, a track of different gage inclined from the main track to one side of the screen, an adjustable switch connecting the tracks, and wheels on the lure-carrying section co-operating with the inclined track.

20. In a course of the character described, a railway track extending along the course, a carriage on the track, comprising a lure-carrying section and an impelling section in detachable engagement therewith, means for the propulsion of the impelling section by movement of an animal moving along the course, and an inclined approach to the track for starting the impelling section in advance of the other section.

21. In a course of the character described, a railway track extending along the course, a carriage on the track, comprising a lure-carrying section and an impelling section in detachable engagement therewith, means for the propulsion of the impelling section by movement of an animal moving along the course, and an adjustable switch connecting the approach with the track.

22. In a course of the character described, a carriage, means for its propulsion by an animal moving along the course, and means to support a moving lure on the carriage in sight of said animal.

23. In a course of the character described, the combination of a railway track extending along the course, a carriage on the track, an instrument adapted to indicate the time in which the carriage moved a predetermined distance along the track, and means for actuating the instrument by movement of the carriage.

24. In a course of the character described, the combination of a railway track extending along the course, a carriage on the track, an electric instrument adapted to indicate the time in which the carriage moved a predetermined distance along the track, a circuit in which the instrument is connected, and a switch in the circuit adapted to be closed by movement of the carriage.

25. In a course of the character described, a railway track having concaved rails, a lure-carrying carriage supported on wheels fitted to said rails, and means for the propulsion of the carriage by an animal following the lure along the course.

In testimony whereof I have affixed my signature.

WALTER CECIL COX.